May 28, 1957   R. O. HELGEBY   2,793,605
CONTINUOUS VIVID ARC INSTRUMENT
Filed Dec. 1, 1954   2 Sheets-Sheet 1

INVENTOR
Ralph O. Helgeby
BY C. H. Sibbe
ATTORNEY

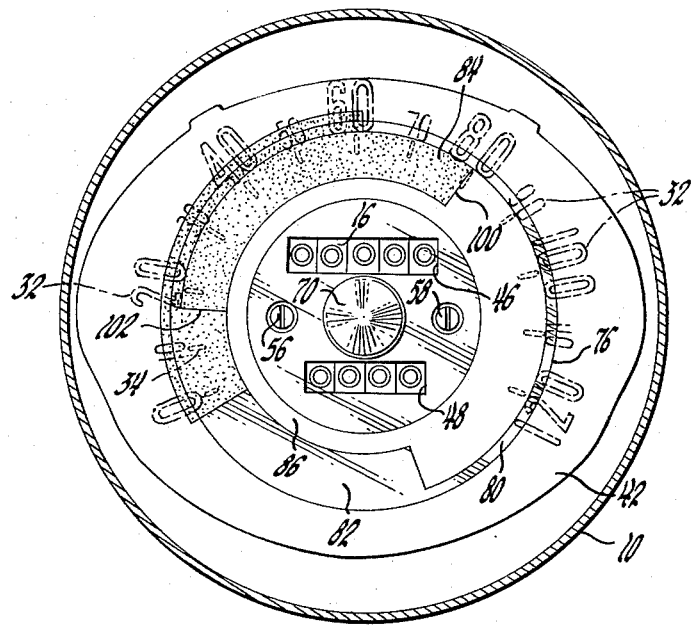

United States Patent Office 2,793,605
Patented May 28, 1957

2,793,605

CONTINUOUS VIVID ARC INSTRUMENT

Ralph O. Helgeby, Flint, Mich., assignor to General Motors Corporation, Detroit, Mich., a corporation of Delaware Application December 1, 1954, Serial No. 472,328

7 Claims. (Cl. 116—57)

This invention relates to indicating instruments such as speedometers for vehicles and more particularly to an improved disc type indicating instrument mounted in a casing and giving a continuous, vivid and arcuate space indication of a magnitude of measurement.

Instruments have heretofore been developed which serve to impart a vivid space indication of a magnitude of measurement despite poor lighting conditions in the location of use. Such instruments have given excellent results. A limitation has been experienced in the use of such instruments, however, in that arcuate indications of readings could not extend an angular distance in excess of 180° because of the mechanical nature of their structures. One such instrument is disclosed in my application for United States Letters Patent Serial No. 341,917, filed March 12, 1953, and entitled "Disc Type Indicating Instrument."

It is an object of the present invention to provide an improved instrument capable of giving a vivid space indication of a magnitude of measurement and having an arcuate range in excess of 180° in so doing.

Another object of the present invention is to provide a first instrument capable of giving a space indication of a magnitude of measurement in the form of an arc which may extend up to and in excess of 180° around a central zone yet providing for visual access of a second instrument located within the same casing.

To these ends, an important feature of the invention is an instrument having a casing with a window and two relatively rotatable and parallel members mounted in the casing and provided with vivid and contrasting opaque portions, the vivid portions of the two members cooperating to form a continuous and vivid arcuate swath capable of extending over 180°. One other feature of the invention comprises two members adapted to function in the use of a first instrument and through which a second instrument may be observed and which has vivid and contrasting portions cooperating with a background to give a continuous arcuate space indication of the first instrument reading.

The above and other features of the invention will now be more particularly described in connection with the accompanying drawings and then pointed out in the claims.

In the drawings:

Fig. 3 is a sectional view taken along the line 3—3 of Fig. 2, indicia of the dial being superposed for clarity of illustration; and Fig. 4 is an exploded perspective view of elements shown in Figs. 1, 2 and 3.

Figure 1:
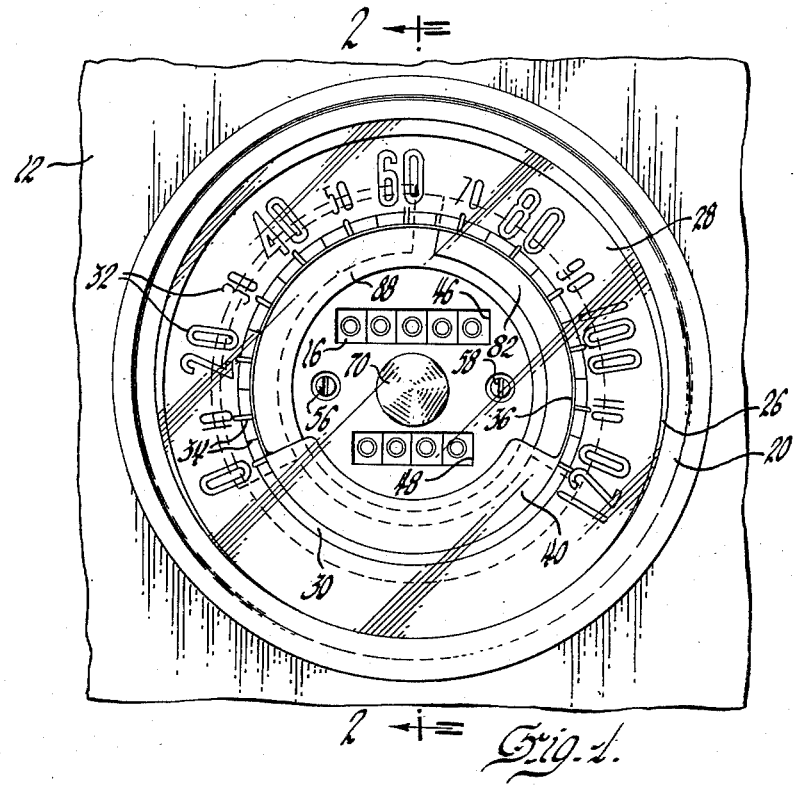
Fig. 1 is a front view of an instrument in which the present invention is incorporated showing that instrument as mounted on a panel.

The instrument as illustrated in the drawings is presented in the form of a speedometer and comprises a casing 10 which is adapted to be mounted in a conventional manner on a supporting panel 12. The casing 10 includes a conventional mechanism 14 for operating an odometer 16 and a speedometer shaft 18. The front of the casing includes an annular bezel 20 which is so attached to the casing that it compresses a rubber gasket 22 against the margin of a clear glass window member 24 and the latter is held against an annular frame 26 which covers the outer margin of an annular dial 28. This dial is made of opaque material and is beveled at 30 to present an attractive appearance. It may be made of transparent material and suitably painted. The outer face of the dial is provided with indicia or numerals 32 placed in an arcuate arrangement concentric with the shaft 18. The beveled portion 30 is provided with graduations 34 to facilitate the reading of the instrument. It will be understood that the numerals and the graduations may be formed on the annular dial 28 in various ways. Conveniently, such markings may be made by painting the numerals on the dial or the dial may be made transparent as stated heretofore or luminescent so that the numerals stand forth under otherwise darkened conditions. If desired, a lamp may be placed in the casing 10 in such a way as suitably to illuminate the markings either by direct or reflected light rays.

The opening 36 in the dial constitutes a window which is restricted by an annular metal member 38 fixed to the casing and which includes an arcuate portion or shield 40 which extends upwardly and constitutes a restrictive frame portion for the window.

Figure 2:
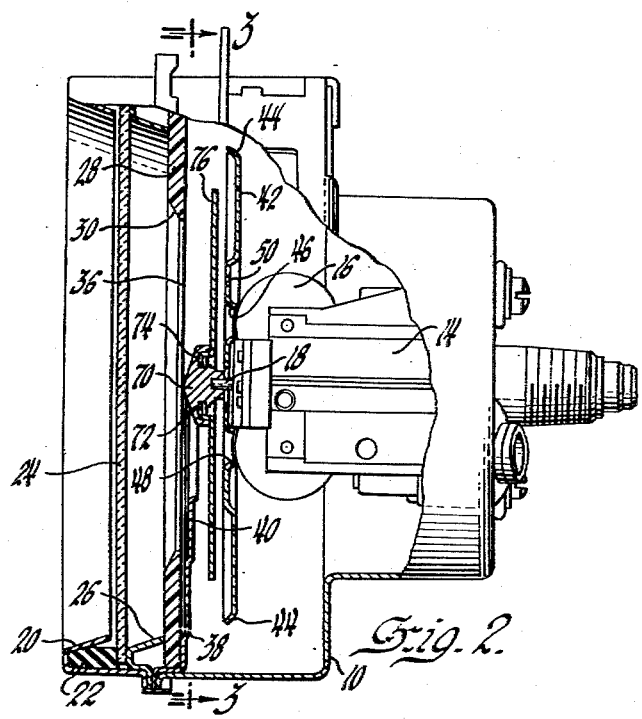
Fig. 2 is a side elevation of the instrument shown in Fig. 1 and a portion being in section along the line 2—2 of Fig. 1.

Fixed to the mechanism 14 and within the casing 10 is a plate 42 which is somewhat ellipsoidal in configuration and which has a forwardly inclined marginal flange 44 as well as parallel and elongated openings 46 and 48. These openings are for the purpose of rendering visible the conventional odometer readings. A central and circular portion 50 of the plate 42 is forwardly offset, as best shown in Figs. 2 and 4, and this central portion includes the two openings 46 and 48 as well as holes 52 and 54 for screws 56 and 58, respectively. A central opening 60 is provided which gives ample clearance for the shaft 18.

It will be understood that the plate 42 is made of opaque material and an arcuate band 62 is placed on the plate as to present a vivid appearance. Conveniently, this vivid appearance may be provided by painting the band red or providing it in the form of a red or other brightly colored decalcomania transfer. An attractive appearance is imparted to the instrument by causing the forward surface of the offset portion 50 to be of glossy appearance such as by buffing when the plate is made of metal. The remaining portion 42A of the plate 42 (not including the arcuate portion 62 or the offset portion 50) is painted or otherwise treated to present a contrast with the band 62. Black paint is satisfactory for this purpose and the contrast between red for the band 62 and the black is very striking particularly when well illuminated.

Affixed to the end of the shaft 18 and rotatable therewith is a hub member 70 which bears an annular recess 72 for retaining a flanged hub portion 74 of a plastic disc 76. A central circular portion 78 of the disc is caused to be transparent to permit observance of the offset portion 50 and the odometer readings. An annular and marginal portion or band 80 of the disc is also transparent and this portion is enlarged to present an arcuate section 82. Within the annular band 80 is an arcuate section 84 which is caused to be vivid in appearance by means of the application of red paint or a suitable red decalcomania and the color shade or appearance of this arcuate section is made the same as that of the arcuate section 62. Surrounding and defining the circular transparent portion 78 is an annular opaque and contrasting ring 86 which is enlarged at 88 to extend outwardly to the narrow annular band 80. This section and the ring 86 are so painted or made as to present the same appearance to the eye as is done by the background 42A of the plate 42.

It will be understood that the diameter of the transparent circular portion 78 is substantially similar to that of the offset portion 50 on the plate 42. It is also to be understood that the sections 82, 84 and 88 are coaxial with the arcuate and vivid background portion 62 and are substantially coextensive therewith insofar as radial distance is concerned.

With a zero reading of the instrument as seen in Fig. 1, the vivid arcuate section 84 is so arranged and proportioned with respect to the arcuate portion or shield 40 that the latter conceals the vivid arc. It is also to be noted that at this setting of the instrument the opaque portion 88 of the plastic disc completely conceals the vivid arcuate background portion 62. It is, therefore, to be noted that no vivid arc appears through the window 36 at zero reading of the speedometer as the opaque portion 88 is black or of a dark contrasting color and conceals the vivid arcuate band 62 and that portion 42A of the plate 42 which is revealed by the transparent section 82 is also of a dark or contrasting appearance.

When the magnitude of the speedometer reading increases and reaches 80, the plastic disc 76 will have rotated in a clockwise direction as viewed in Fig. 3, and the leading edge 100 of the vivid arcuate section 84 will have traveled beyond the full length of the vivid arcuate portion 62. The trailing end portion 102 of the vivid arcuate section 84 will have rotated to reveal a portion of the vivid arcuate portion 62. In this way, the vivid portion 62 and the vivid section 84 cooperate to present a continuous, vivid and arcuate space indication of the instrument reading. With a further increase of the vehicle speed, increasing amounts of the vivid arcuate portion 62 are revealed and increasing amounts of the vivid arcuate section 84 are employed to give the reading. Because of the potential addition of these two substantially full arcuate lengths, the maximum reading of the instrument may extend an arcuate distance of substantially 230° about the shaft 18. Simultaneous with the securing of a space reading of the speedometer, the odometer readings are plainly visible through the transparent circular portion 78. Upon a reduction in speed of the vehicle, the edge 102 rotates counterclockwise, as viewed in Fig. 3, and the vivid background is progressively concealed from view after which the vivid 84 is progressively concealed by the shield 40.

It is to be noted that in any embodiment herein contemplated it is not necessary to make the disc 76 of transparent material. It could be made of metal and be annular in form and supported on the shaft 18 by means of a hub and suitable arms. In such a case, the annular member would be cut out to present an arcuate section in place of the transparent section 82 for progressive revelation or concealment of the vivid background. This conception of utilizing a disc of opaque material with cut-out portions may be utilized without departing from the spirit of the present invention.

It will be apparent that in the use of the present invention the angular extent of the space reading is so increased that an instrument reading may be made more prominent than heretofore and that spreading out of the indicia effectively increases the accuracy and ease of reading.

I claim:

1. An instrument, such as a speedometer, comprising a casing with a window, two relatively rotatable and parallel members mounted in said casing for view through said window, each of said members having a vivid portion and a contrasting opaque portion, one of said members being interposed between said window and the other of said members and having a window portion, and the arrangement being such that relative rotation of said members about an axis may present a continuous and vivid swath partially viewable through said window portion and extending over 180° around said axis during a high range of readings of said instrument.

2. An instrument such as a speedometer comprising a casing with a window, two relatively rotatable and parallel members mounted in said casing for view through said window, each of said members having a vivid portion and a contrasting opaque portion, one of said members being interposed between said window and the other of said members and having a transparent portion, and the arrangement being such that relative rotation of said members about an axis may present a continuous and vivid swath comprising a vivid portion of one of said members as visible through said transparent portion and the vivid portion of the other of said members.

3. An instrument such as a speedometer comprising a casing, an outer window in said casing, a shaft journaled in said casing and arranged to be rotated in proportion to a magnitude of measurement, a member fixed in position within said casing and presenting a vivid background and a contrasting background, a disc fixed to said shaft to rotate therewith and having three sections arranged around said shaft, one of said sections being vivid, the second of said sections being opaque and of contrasting appearance, the third of said sections constituting an inner window revealing the said fixed member, means fixed to said casing as a shield concealing a portion of said disc and extending less than 180° around said shaft, and said vivid background and vivid section cooperatively extending more than 180° around said shaft at an upper range of readings of the instrument.

4. An instrument such as a speedometer, comprising a casing having a window, a shaft journaled in said casing and arranged substantially normal to said window, means for rotating said shaft in proportion to a magnitude of measurement, means arranged to restrict said casing window an arcuate distance of less than 180° around said shaft, a member fixed to and within said casing and presenting portions of vivid contrast, a disc fixed to said shaft for rotation therewith and interposed between said restricting means and said member, said disc having two opaque sections of vivid contrast and one window section extending in series around said shaft, and one of said opaque sections being arranged to cooperate with a portion of said fixed member to present a vivid band extending partially around said shaft.

5. An instrument such as a speedometer comprising a casing having a circular window with an arcuate frame portion extending an angular distance of less than 180° around the window margin, a shaft concentric with and substantially normal to said window, means for rotating said shaft in proportion to a magnitude of measurement, a member having a vivid and a contrasting background fixed within said casing, a disc fixed to said shaft for rotation therewith and interposed between said arcuate frame portion and said fixed member, said disc having an opaque section, a vivid section and a window section, and said sections being arranged at zero reading of the instrument so that the vivid section is concealed by the said arcuate frame portion, the said vivid background is concealed by the said opaque section, and the contrasting background is revealed by said window section.

6. A first instrument such as a speedometer comprising a casing having a circular window with an arcuate frame portion extending an angular distance of less than 180° about said window, a shaft concentric with and substantially normal to said window, means for rotating said shaft in proportion to a magnitude of measurement, a second instrument mounted in said casing, a member having vivid and contrasting background surfaces fixed within said casing and partially concealing said second instrument, a disc partially of transparent material fixed to said shaft and interposed between said arcuate frame portion and said fixed member, said disc having an arcuate opaque section, an arcuate vivid section, an arcuate transparent section and a circular transparent section circumscribed by said three arcuate sections, said circular transparent section being arranged to reveal said second instrument, and said three arcuate sections being arranged at zero reading of the instrument so that the said arcuate vivid section is concealed by the said arcuate frame portion, the vivid background on said fixed member is concealed by the said arcuate opaque section, and the contrasting background on said fixed member is revealed by said arcuate transparent section.

7. An instrument such as a speedometer comprising a casing with a window, two relatively rotatable and parallel members mounted in said casing, each of said members having a vivid portion and a contrasting opaque portion, one of said members being interposed between said window and the other member and including a transparent portion, and said transparent portion cooperating with the vivid portions of said members and being thereby adapted to reveal the vivid portion of said other member as a continuation of the vivid portion of said one member through said window.

References Cited in the file of this patent

UNITED STATES PATENTS 2,702,518     Swartzlander _____ Feb. 22, 1955

FOREIGN PATENTS 496,350     Germany _____ Apr. 22, 1930